United States Patent
Menge et al.

(10) Patent No.: US 7,820,974 B2
(45) Date of Patent: Oct. 26, 2010

(54) SCINTILLATION DETECTOR AND METHOD OF MAKING

(75) Inventors: Peter R. Menge, Chagrin Falls, OH (US); Brian Bacon, Bristolville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 18 days.

(21) Appl. No.: 12/106,011

(22) Filed: Apr. 18, 2008

(65) Prior Publication Data

US 2009/0261253 A1    Oct. 22, 2009

(51) Int. Cl.
G01T 1/20    (2006.01)

(52) U.S. Cl. .................................. 250/361 R

(58) Field of Classification Search ............. 250/361 R, 250/362, 370.09, 370.11, 370.12, 363.02
See application file for complete search history.

(56) References Cited

U.S. PATENT DOCUMENTS

| | | | |
|---|---|---|---|
| 4,158,773 A | 6/1979 | Novak | |
| 4,360,733 A | 11/1982 | Novak et al. | |
| 4,383,175 A | 5/1983 | Toepke | |
| 4,694,170 A * | 9/1987 | Slodzian et al. | 250/309 |
| 4,764,677 A | 8/1988 | Spurney | |
| 4,994,673 A | 2/1991 | Perna et al. | |
| 5,087,818 A | 2/1992 | Bellian et al. | |
| 5,283,439 A | 2/1994 | Bouissou et al. | |
| 5,406,078 A | 4/1995 | Jacobson | |
| 5,753,918 A | 5/1998 | Pandelisev | |
| 5,869,836 A | 2/1999 | Linden et al. | |
| 6,297,507 B1 | 10/2001 | Chen et al. | |
| 6,373,066 B1 * | 4/2002 | Penn | 250/390.11 |
| 6,433,340 B1 | 8/2002 | Penn | |
| 6,624,420 B1 | 9/2003 | Chai et al. | |
| 6,657,201 B2 | 12/2003 | DeJule | |
| 6,781,134 B1 * | 8/2004 | Murray et al. | 250/370.13 |
| 6,844,419 B2 | 1/2005 | Raghavan et al. | |
| 7,034,305 B2 | 4/2006 | Frederick et al. | |
| 7,151,261 B2 * | 12/2006 | Chai | 250/362 |
| 2005/0045821 A1 * | 3/2005 | Noji et al. | 250/311 |
| 2005/0184241 A1 | 8/2005 | Clarke et al. | |
| 2005/0253072 A1 | 11/2005 | Chai | |
| 2006/0027742 A1 * | 2/2006 | Srivastava et al. | 250/256 |
| 2006/0102834 A1 * | 5/2006 | Mickael | 250/269.1 |
| 2007/0209581 A1 | 9/2007 | Ferrand et al. | |
| 2009/0101816 A1 * | 4/2009 | Noji et al. | 250/310 |

OTHER PUBLICATIONS

Rozsa, C. M. et al., "Characteristics of Scintillators For Well Logging to 225C," Bicron Corporation, Newbury, OH 44065, 1989, 12 pgs.
Rozsa, C., et al., "Stability of Bircon's Standard Logging Detectors," 3 pgs.

* cited by examiner

*Primary Examiner*—David P Porta
*Assistant Examiner*—Faye Boosalis
(74) *Attorney, Agent, or Firm*—Larson Newman & Abel, LLP

(57) ABSTRACT

A method of assembling a detector includes conditioning a rare-earth halide scintillator crystal in a sealed container, wherein the conditioning process includes heating the scintillator crystal, reducing the pressure within the sealed container for an evacuation period while heating, and flowing a purging gas through the sealed container for a flowing duration while heating. The method further includes assembling a detector comprising the scintillator crystal in an assembly environment comprising an inert gas.

21 Claims, 3 Drawing Sheets

SCINTILLATION DETECTOR AND METHOD OF MAKING

CROSS-REFERENCE TO RELATED APPLICATION(S)

BACKGROUND

1. Field of the Disclosure

The present disclosure is directed to scintillators, particularly ruggedized scintillation detectors for industrial applications.

2. Description of the Related Art

Scintillation detectors have been employed in various industrial applications, such as the oil and gas industry for well logging. Typically, such detectors have scintillator crystals made of an activated sodium iodide material that is effective for detecting gamma rays. Generally, the scintillator crystals are enclosed in tubes or casings, which include a window permitting radiation induced scintillation light to pass out of the crystal package for measurement by a light-sensing device such as a photomultiplier tube. The photomultiplier tube converts the light photons emitted from the crystal into electrical pulses that are shaped and digitized by associated electronics that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs.

Desired properties of scintillation detectors include high resolution, high brightness, and robust design to withstand mechanical and thermal loads, while providing a high quality hermetic seal to isolate the sensitive internals of the detector from harsh operating environments. In this latter aspect, a common practice in the utilization of scintillation detectors is to take measurements while drilling (MWD). For MWD applications, the detector should be ruggedized, that is, it should have a high shock resistance and be capable of withstanding high temperatures, while maintaining performance specifications for a reasonable lifetime.

Improved scintillation properties such as resolution and brightness have been achieved by the migration from conventional crystals such as alkali halides (e.g., sodium iodide), bismuth germinate (BGO), and gadolinium ortho-silicate (GSO) crystals, to rare-earth halides. However, successful integration of such materials has been found to pose numerous engineering challenges, including the development of suitable packaging and packaging techniques.

As such, there continues to be a need for improved scintillation detectors, particularly ruggedized scintillation detectors incorporating state of the art scintillator materials that can withstand the rigors of industrial applications.

SUMMARY

According to a first aspect, a method of assembling a detector is disclosed that includes conditioning of a rare-earth halide scintillator crystal in a sealed container, such that the conditioning process includes the steps of heating the scintillator crystal, reducing the pressure within the sealed container for an evacuation period while heating, and flowing a purging gas through the sealed container for a flowing duration. The method further includes assembling a detector comprising the scintillator crystal in an assembly environment comprising an inert gas. According to one embodiment, the rare-earth halide scintillator crystal can include one of activated $LaBr_3$, $LaCl_3$, $LuI_3$, $GdI_3$, and $GdBr_3$.

In reference to particulars of the heating process, in one embodiment, heating includes heating at rate of at least about 0.5° C./min, and in another embodiment at a rate of not greater than about 10° C./min. In accordance with other embodiments, the heating process further includes heating to a temperature of not less than about 100° C.

With respect to the step of flowing a purging gas, in one embodiment, the purging gas is flowed while heating. The purging gas can be selected from the group of materials consisting of a halogen-containing gas, an inert gas, and a noble gas. In particular, the purging gas can include argon or $CF_4$. During the flowing process, the purging gas can be flowed at a rate of at least about 10 liters/min. In one embodiment, the flowing duration is at least about 5 minutes.

In accordance with one embodiment, during the process of reducing the pressure, the pressure is not greater than about 1E-1 Torr or less. Moreover, the evacuation period can be at least about 2 minutes, or in some embodiments can be longer, such as at least about 5 minutes, or 10 minutes.

In accordance with another embodiment of the first aspect, the steps of reducing the pressure and flowing the purging gas while heating can be repeated, such as for example, at least two times, or even at least through three cycles.

Additionally, in other embodiments, the process further includes holding the scintillator crystal in a holding atmosphere having the purging gas and at a holding temperature before assembling. During such a process, the holding atmosphere can have an absolute pressure of at least about 110 kPa. Moreover, in one instance, the process further includes holding the scintillator crystal in the holding atmosphere for at least about 1 hour. In accordance with another example, the conditioning process also includes exposing the scintillator crystal to a reduced pressure atmosphere prior to heating. For example, in one instance, the reduced pressure atmosphere has a pressure not greater than about 1E-1 Torr.

In other embodiments, the process further includes cleaning the scintillator crystal prior to conditioning. For example, cleaning can include removing material from an exterior surface of the scintillator crystal, such as at least about 0.25 mm of material from exposed exterior surfaces of the scintillator crystal. In another embodiment, cleaning can also include polishing a surface of the scintillator crystal prior to conditioning. In one instance the polishing is completed using an abrasive, such as a ceramic powder material.

The cleaning process can further include cleaning detector components prior to assembling. In accordance with one embodiment, cleaning of the detector components (not including the scintillator crystal) includes rinsing the detector components using an organic-based solvent, such as for example, alcohols, ketones, and acetates. Additionally, in other examples, cleaning the detector components also includes heating the components to a volatilization temperature of at least about 175° C. for not less than about 12 hours.

In another embodiment, the assembly environment can include an inert gas, such as argon. In particular, the assembly environment can include an oxygen content of not greater than 10 ppm of oxygen and not greater than 15 ppm of water vapor.

According to a second aspect, a scintillation detector is disclosed that includes a rare-earth halide scintillator crystal in a sealed casing, the scintillation detector having a relative light output $LO(r)=((LO_{100})/(LO_0))\times 100\%$, of not less than about 75% wherein $LO_{100}$ is the detected light output of the detector after about 100 hours of exposure at 150° C. and $LO_0$ is the original detected light output at room temperature prior to exposure at 150° C. In other instances, the relative light output is greater, such as not less than about 80%, not less than about 85%, not less than about 90%, or even not less than about 92% after 100 hours of exposure at 150° C. In one particular embodiment, the relative light output LO(r) is within a range between about 99% and about 92%, after 150 hours of exposure at 150° C.

In one embodiment, the detector includes a shock absorbing member substantially surrounding the scintillator crystal. In one embodiment, the shock absorbing member comprises silicone having a total mass loss (TML) of less than about 1.0% according to ASTM E595. In another embodiment, the shock-absorbing member has a Shore A hardness within a range of between about 40 and about 70.

The detector can further include a reflector disposed between the scintillator crystal and the shock absorbing member and substantially surrounding the scintillator crystal. In one particular example, the reflector is a fluorinated polymer. Additionally, the detector can further include a sleeve substantially surrounding the shock absorbing member. Moreover, the detector can be coupled to the a photomultiplier tube, via a light pipe disposed between the detector and the photomultiplier tube. The coupling can be aided by using biasing members.

In accordance with a third aspect, a scintillation detector is disclosed that includes a rare-earth halide scintillator crystal in a sealed casing, the sealed casing comprising an atmosphere having an oxygen content of not greater than about 10 ppm and a water vapor content not greater than about 15 ppm. Additionally, the scintillation detector has a relative light output $LO(r)=((LO_{100})/(LO_0))\times 100\%$, of not less than about 92% wherein $LO_{100}$ is the detected light output of the detector after about 100 hours of exposure at 150° C. and $LO_0$ is the original detected light output at room temperature prior to exposure at 150° C.

In accordance with another aspect, a scintillation detector includes a rare-earth halide scintillator crystal in a sealed casing, and has an energy resolution degradation factor $\Delta ER=((ER_{100}-ER_0)/(ER_0))\times 100\%$, of not greater than about 25% wherein $ER_{100}$ is the energy resolution of the detector after about 100 hours of exposure at 150° C. and $ER_0$ is the original energy resolution at room temperature prior to exposure at 150° C. In particular instances, the ER(r) is not greater than about 20%, 15%, or even not greater than about 10% when measured at room temperature after 100 hours of exposure at 150° C.

In accordance with another aspect, a scintillation detector includes a rare-earth halide scintillator crystal in a sealed casing, and has an absolute energy resolution of not greater than about 35 keV (5.3%) at 662 keV after exposing the detector to temperatures of not less than 150° C. for not less than about 100 hours. In particular embodiments, the absolute energy resolution can be less, such as not greater than about 30 keV, 25 keV, 22 keV, 20 keV, and particularly within a range between about 16 keV and about 20 keV at 662 keV.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems or methods. Moreover, some statements may apply to some inventive features but not to others.

A scintillation detector is disclosed that is suitable for use in extreme environments. In particular, according to embodiments disclosed herein, the detector is designed and assembled to provide notably desirable performance under challenging conditions, including MWD applications.

Figure 1:
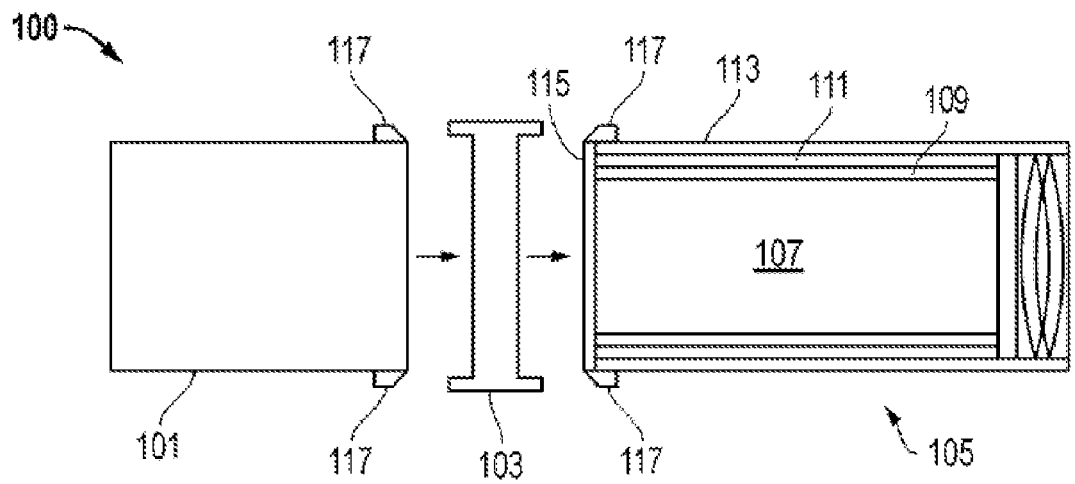
FIG. 1 includes an illustration of a detector according to one embodiment.

Referring to the figures, FIG. 1 illustrates a radiation detector 100 according to one embodiment. As illustrated, the radiation detector includes a photosensor 101, light pipe 103, and a scintillator housing 105. As mentioned above, the scintillator housing 105 can include a scintillator crystal 107 disposed within and substantially surrounded by a reflector 109 and a shock absorbing member 111. The scintillator crystal 107, reflector 109, and the shock absorbing member 111 are housed within a casing 113 which includes a window 115 at one end of the casing 113.

In further reference to FIG. 1, the photosensor 101 can be a device capable of spectral detection and resolution, such as a photomultiplier tube or other detection device. The photons emitted by the scintillator crystal 107 are transmitted through the window 115 of the scintillator housing 105, through the light pipe 103, to the photosensor 101. As is understood in the art, the photosensor 101 provides a count of the photons detected, which provides data on the radiation detected by the scintillator crystal. The photosensor 101 can be housed within a tube or housing made of a material capable of withstanding and protecting the electronics of the photosensor 101, such as a metal, metal alloy or the like. Various materials can be provided with the photosensor 101, such as within the housing, to stabilize the device during use and ensure good optical coupling between the light pipe 103 and the scintillator housing 105.

As illustrated, the light pipe 103 is disposed between the photosensor 101 and the scintillator housing 105. The light pipe 103 can facilitate optical coupling between the photosensor 101 and the scintillator housing 105. According to one embodiment, the light pipe 103 can be coupled to the scintillator housing 105 and the photosensor 101 using biasing members 117 that provide a spring resiliency. Such biasing members 117 can facilitate absorption of shocks to the detector 100 which can reduce false readings and counts during use of the device. As will be appreciated, the biasing members can be used in conjunction with other known coupling methods such as the use of an optical gel or bonding agent.

Figure 2:
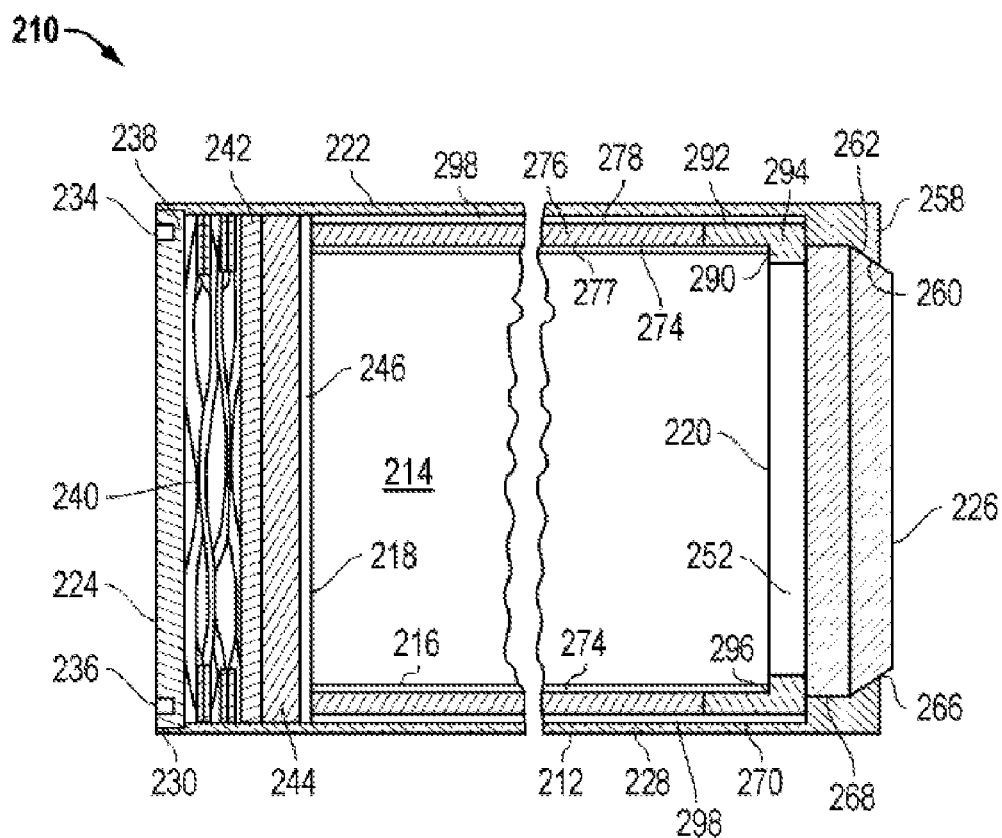
FIG. 2 includes a cross-sectional illustration of a scintillation detector according to one embodiment.

In further reference to the scintillation detector, FIG. 2 provides an illustration of a scintillation detector 210, according to one embodiment. The scintillation detector 210 includes a scintillator crystal 214 disposed within a housing 212. According to one embodiment, the scintillator crystal 214 can be an activated halide crystal, desirably a high performance rare-earth halide. Examples of rare-earth halides include activated rare-earth bromides, chlorides and iodides, including activated $LaBr_3$, $LaCl_3$, $LuI_3$, $GdI_3$, $GdBr_3$. Particular activating species include cerium, praseodymium, europium, and neodymium. Particular scintillator compositions include cerium activated lanthanum bromide ($LaBr_3$:Ce), cerium activated lanthanum chloride ($LaCl_3$:Ce). Other materials include cerium activated gadolinium iodide ($GdI_3$:Ce), cerium activated lutetium iodide ($LuI_3$:Ce), and in some cases cerium bromide ($CeBr_3$) and cerium chloride ($CeCl_3$). In accordance with one particular embodiment, the scintillator crystal 214 is activated lanthanum bromide.

The scintillator crystal 214 can have various shapes, such as a rectangular shape, or a cylindrical surface 216 as illustrated including flat end faces 218 and 220. It will be appreciated that the surface finish of the scintillator crystal 214 can be sanded, polished, ground, etc., as desired.

In further reference to FIG. 2, the housing 212 can include a casing 222 that can be cylindrical or tubular to effectively fit the selected geometry of the scintillator crystal 214. The casing 222 can be closed at its rear end by a back cap 224 and at its front end by an optical window 226. The optical window 226 can include a material that is transmissive to scintillation light given off by the scintillator crystal 214. According to one embodiment, the optical window 226 is made of sapphire. The casing 222 and back cap 224 can be made of a non-transmissive material, such as a metal, metal alloy, or the like. As such, in one embodiment, the casing 222 and the back cap are made of stainless steel or aluminum. The back cap 224 can be coupled to the casing 222 using a sealant, mechanical fasteners, or by a vacuum type peripheral weld. According to a particular embodiment, the casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces welding heat, conducting heat away from the welding flanges to permit formation of a desired weld.

The scintillation detector 210 further includes a biasing member 240, a backing plate 242, a cushion pad 244, and an end reflector 246. The biasing member 240, can include a spring, as illustrated, or other suitable resilient biasing members. The biasing member 240 functions to axially load the crystal and bias it towards the optical window 226. According to one embodiment, the biasing member 240 can be a stack of wave springs disposed crest-to-crest as shown. Other suitable biasing members can include but are not limited to, coil springs, resilient pads, pneumatic devices or even devices incorporating a semi-compressible liquid or gel. As such, suitable materials for the biasing member 240 can include a metal, a metal alloy, polymers, or the like.

The backing plate 242 disperses the force of the biasing member 240 across the area of the cushion pad 244 for substantially uniform application of pressure and axial loading of the rear face 218 of the scintillator crystal 214. Alternatively, the backing plate and biasing member may be integrated into a single structure, such as in the case of an elastomeric polymer member, which may have a rigid reinforcement layer.

The cushion pad 244 can typically be made of a resilient material such as a polymer, particularly an elastomer, such as, a silicone rubber. The thickness of the cushion pad 244 can vary within a range of about 1.5 mm to about 8 mm for most crystals.

Additionally, the cushion pad 244 can be adjacent to the end reflector 246. The end reflector 246 can include a suitable reflecting material such as a powder, like aluminum oxide (alumina) powder, or a reflective tape or foil such as, a white porous unsintered PTFE material. A porous reflective material facilitates the escape of air or gas from between the reflector film and crystal face and can avoid pockets of trapped air or gas which could prevent the end reflector 246 from being pushed by the cushion pad 244 flat against the rear end face 218 of the scintillator crystal 214 which can have a negative impact on reflectivity at the reflector-crystal interface. The reflector material may be about 0.25 mm thick. According to particular embodiment, the reflecting material is a film that can be wrapped at least once around the crystal and possibly two or more times as desired. Alternatively, the end reflector 246 can be a metal foil disk, which conforms to the surface of the crystal end face 218 and provides suitable reflectance toward the optical window 226.

In accordance with a particular embodiment, the end reflector 246 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylene, ethylene-chlorotrifluoroethylene, and mixtures of such fluoropolymers. In one particular embodiment, the end reflector 246 is made essentially of a fluorinated polymer. In another more particular embodiment, the end reflector 246 is made essentially of polytetrafluoroethylene (PTFE).

As indicated above, the biasing member 240 exerts a force on the scintillator crystal 214, to urge the scintillator crystal 214 towards the optical window 226 thereby maintaining suitable optical coupling between the scintillation crystal 214 and the optical window 226. An optional layer 252 (or interface pad) can be provided between the scintillator crystal 214 and the optical window 226 to facilitate effective optical coupling. According to one embodiment, layer 252 can include a transparent polymer material, such as a transparent silicone elastomer. The thickness of the interface pad 252 can be within a range of about 1.5 mm to about 8 mm for most crystals.

In further reference to FIG. 2, as illustrated, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator crystal 214 such that it can be radially constrained by the casing wall 222. Optionally, to permit wetting of the optical window 226 by the solder, the sealing edge surfaces of the optical window 226 can include a metalized coating such as platinum.

According to the illustrated embodiment of FIG. 2, the inner beveled surface 260 can forwardly terminate at a cylindrical surface 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270.

According to another embodiment, the scintillator crystal 214 can be substantially surrounded by a reflector 274. The reflector 274 can incorporate materials as described above in accordance with the end reflector 246, such as a porous material including a powder, foil, metal coating, or polymer coating. According to one embodiment, the reflector 247 is a layer of aluminum oxide (alumina) powder. In another embodiment, the reflector 247 is a self-adhering white porous PTFE material. As noted above, air or gas that might otherwise be trapped between the end reflector 246 and the scintillator crystal 214 can escape through the porous reflector 274.

In accordance with a particular embodiment, the reflector 274 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the reflector 274 is made essentially of a fluorinated polymer. In another more particular embodiment, the reflector 274 is made essentially of polytetrafluoroethylene (PTFE).

In addition to the reflector 274 surrounding the scintillator crystal 214, a shock absorbing member 276, can substantially surround the scintillator crystal 214. The shock absorbing member 276 can surround and exert a radial force on the reflector 274 and the scintillator crystal 214. As shown, the shock absorbing member 276 can be cylindrical to accompany the selected shape of the scintillator crystal 214. The shock absorbing member 276 can be made of a resiliently compressible material and according to one embodiment, is a polymer, such as an elastomer. Additionally, the surface contour of the shock absorbing member 276 can vary along the length to provide a frictionally engaging surface thereby enhancing the stabilization of the scintillator crystal 214 within the casing 222. For example, the shock absorbing member 276 can have a uniform inner surface 277 and an outer surface 278, or optionally, can have ribs extending axially or circumferentially on the inner surface 277, the outer surface 278, or both. Still, the shock absorbing member 276 can have protrusions, dimples, or other shaped irregularities on the inner surface 277, the outer surface 278, or both surfaces to frictionally engage the scintillator crystal 214 and the casing 222. The shock absorbing member is discussed in more detail below.

As also illustrated, the scintillation detector 210 can include a ring 290 that extends from the front end of the shock absorbing member 276 to the optical window 226. The ring 290 facilitates stabilization and alignment of the circular interface pad 252 during assembly of the scintillation detector 210. The ring 290 has an axially inner end portion 292 substantially surrounding the scintillator crystal 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator crystal 214 during assembly.

The ring 290 can be made of resilient material, such as a polymer, generally an elastomer, and according to one embodiment, can include silicone. Additional material, such as alumina powder can be added to enhance the reflection of the ring 290. The ring 290 and the shock absorbing member may alternatively be integrated together as a continuous integral component.

In further reference to the components of the scintillation detector 210 as illustrated in FIG. 2, a sleeve 298 extends longitudinally from the optical window 226 to approximately the back cap 224. The sleeve 298 can substantially surround the shock absorbing member 276 and scintillator crystal 214 and in a compressed state (when fitted within the casing 222) provides a radially compressive force to the shock absorbing member 276 and scintillator crystal 214. According to one embodiment, insertion of the sleeve 298 into the casing 222 requires compression of the sleeve thereby providing a radially compressive force on the crystal 214. Suitable materials for the sleeve 98 include resilient materials, such as a metal, metal alloy, a polymer, carbon or the like. Additionally, the sleeve 298 can include a material that has a lower coefficient of friction with the material of the casing 222 than does the material of the shock absorbing member 276 with the material of the casing 222.

In accordance with the foregoing, stability of the shock-absorbing member and cushion pad at elevated temperatures is desirable. According to embodiments herein, the material has less than 1.0% total mass loss (TML) and less than 0.1% collected volatile condensable material (CVCM) according to ASTM E595 (subject to a temperature of 125° C., in a pressure of less than $7 \times 10^{-3}$ Pa for twenty four hours). According to a particular embodiment, the material of the shock absorbing member has a total mass loss of not greater than about 0.50% when subject to the ASTM E595 standardized test. Still, the total mass loss of the material can be less, such as not greater than about 0.40%, or even not greater than about 0.30%. Additionally, suitable materials for the shock absorbing member can have a low level of total mass loss and when subject to temperatures above and beyond those required by ASTM E595. Accordingly, the material of the shock absorbing member can have a total mass loss of not greater than about 1.0% when subject to a temperature of not less than about 150° C., or about 175° C., or even in some cases about 200° C., under a pressure of less than $7 \times 10^{-3}$ Pa for twenty four hours. Use of silicone, such as LSR (liquid silicone rubber), in combination with the particularly low volatility characteristics represents a particular combination.

In another embodiment, the material of the shock absorbing member and cushion pad can include a material having a filler. The filler typically includes a colloidal ceramic powder, such as alumina or silica, which in some situations facilitates the formation of a thixotropic material for working purposes. Additionally, in one embodiment, the cushion pad has a Shore A hardness within a range of between about 40 and about 70, such as within a range of between about 40 and about 60. Generally, such as material can also be a bakeless material, in accordance with such a bakeless material described above.

Figure 3:
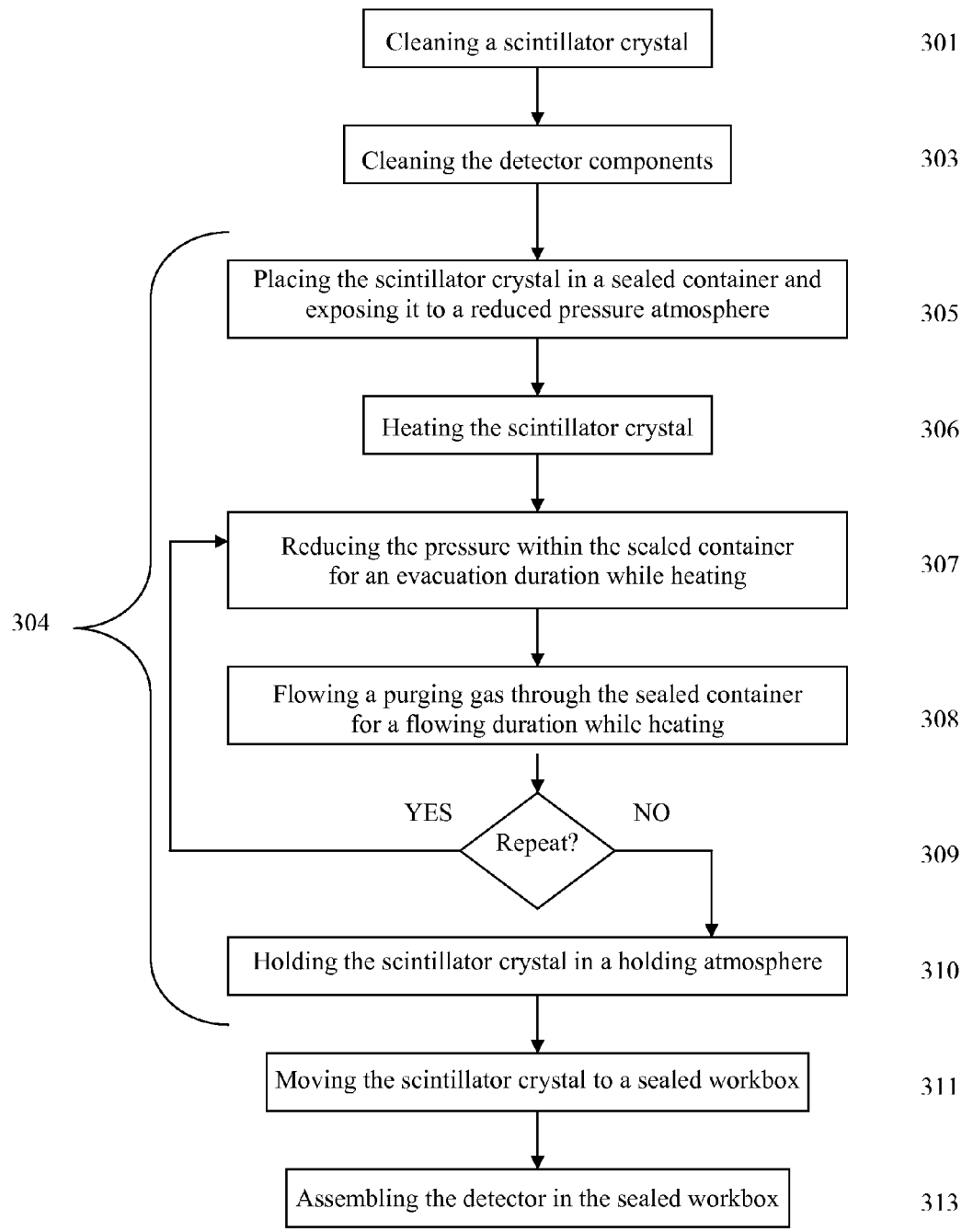
FIG. 3 includes a flow chart illustrating a method of forming a detector in accordance with one embodiment.

Referring to FIG. 3, a flowchart is illustrated including a method of forming a scintillation detector. As illustrated in FIG. 3, the process is initiated at step 301 by cleaning a scintillator crystal. Generally, the process of cleaning a scintillator crystal includes removing material from an exterior surface of the scintillator crystal, such as by mechanical abrasion, facilitating removal of films and residue from the crystal surface. For such cleaning operations, a dry, inorganic material is generally suitable, such as a ceramic or metal to abrade the surface of the scintillator crystal and remove a layer of material. In particular, use of organic materials during cleaning is avoided to reduce the potential of contamination, including avoiding contact with gloves containing organic materials such as natural rubber, butyl rubber, latex, neoprene, nitrile, or vinyl. In some instances, gloves used during a cleaning process can have a stainless steel mesh covering as the contact surface for handle the crystal.

In accordance with a particular embodiment, cleaning of the scintillator crystal includes removing at least about 0.25 mm of material from all exposed exterior surfaces of the scintillator crystal. More particularly, a greater amount of material may be removed, such as at least about 0.5 mm, or even at least about 1 mm of material. The amount of material removed may be limited, such as not greater than about 5 mm of material.

After removing a layer of material from the surface of the scintillator crystal, the cleaning process can further include polishing one or more surfaces of the scintillator crystal. As such, the face of the scintillator crystal configured to be adjacent to the light pipe and in the direct optical path is typically polished. Polishing can be completed using a dry powdered ceramic material, such as fine grained alumina.

After cleaning the scintillator crystal, the process can continue at step 303 by cleaning the detector components. In accordance with one embodiment, the process of cleaning the detector components includes rinsing the components with an organic-based solvent. Suitable organic-based solvents can include water (e.g., deionized water), alcohol, ketones, and acetates. In a more particular embodiment, the cleaning process can include multiple rinses with one or more organic-based solvents. For example, rinsing the detector components initially with a deionized water rinse, followed by a rinsing the same detector components with methanol, and subsequently rinsing the same detector components with acetone.

After suitably rinsing the detector components, the process of cleaning can further include subjecting the thermally stable detector components, such as glass and metal components, to a heating procedure. Heating the detector components may facilitate volatilization of residual organics and other contaminants. In accordance with one embodiment, the heating process includes heating the detector components to a volatilization temperature of at least about 175° C. Other embodiments may utilize higher temperatures, such as for example, at least about 190° C., 200° C., or even at least about 225° C. Generally the volatilization temperature is not greater than about 300° C. After reaching the volatilization temperature, the detector components are typically held at the volatilization temperature for not less than about 12 hours, such as not less than about 15 hours, or even not less than about 18 hours. The duration of holding the components at the volatilization temperature may be limited, such as not greater than about 30 hours.

After cleaning the detector components, assembling of the scintillation detector continues by conditioning the scintillator crystal. The conditioning process 304 illustrated in FIG. 3 includes steps 305, 306, 307, 308, 309, and 310 (305-310), and generally includes a combination of procedures aiding the removal of contaminates from the surface of the crystal while preparing it for operation at elevated temperatures, which is particularly suitable for forming a scintillation detector capable of improved lifetime and performance in industrial applications.

As illustrated in FIG. 3, the conditioning process is initiated at step 305 by placing the scintillator crystal in a sealed container and exposing it to a reduced pressure atmosphere. Generally, the reduced pressure atmosphere has a pressure substantially less than standard atmospheric pressure, such as on the order of not greater than about 1E-1 Torr, not greater than about 1E-2 Torr, such as not greater than about 1E-3 Torr, or even not greater than about 1E-5 Torr. The reduced pressure atmosphere may be within a range between about 1E-3 Torr and about 1E-6 Torr.

Exposure of the scintillator crystal to the reduced pressure atmosphere can last for a duration of not less than about 15 minutes, such as not less than about 30 minutes, or not less than about 1 hour. The duration of the reduced pressure treatment can be limited such as not greater than about 3 hours.

After sufficiently exposing the scintillator crystal to a reduced pressure atmosphere, the conditioning process can continue at step 306 by heating the scintillator crystal. Heating in combination with other processes facilitates volatilizing certain species from the scintillator crystal. As such, the conditioning process may be carried out in an oven or other vessel having atmospheric and temperature control capabilities. In accordance with one embodiment, the sealed container is heated at a rate of at least about 0.5° C./min, such as at least about 1° C./min, at least about 2° C./min, or even at least about 5° C./min. The heating rate can be limited, such that in certain instances it is not greater than 10° C./min, and more particularly within a range between about 1° C./min and about 6° C./min.

During the heating process, the sealed container can be heated to a temperature of not less than about 100° C. According to other embodiments, the sealed container is heated to a temperature of not less than about 125° C., such as not less than about 150° C., or even not less than about 175° C. Typically, the sealed container is heated to a temperature within a range between about 100° C. and about 300° C.

After initiating the heating process at step 306, the conditioning process can continue at step 307 by reducing the pressure within the sealed container for an evacuation period while heating the scintillator crystal. Reducing the pressure within the sealed container is suitable to purge the ambient atmosphere from within the sealed container, facilitating the removal of certain species, such as oxygen, water vapor and any contaminates from the surface of the crystal from the atmosphere. As such, in one embodiment, the process of reducing the pressure within the sealed container is conducted while heating.

Reducing the pressure can include reducing the pressure within the sealed container to a pressure of not greater than about 1E-1 Torr. In other embodiments, the pressure can be less, such as not greater than about 1E-3 Torr, or even not greater than about 1E-5 Torr. Typically the pressure is within a range of about 1E-3 Torr to about 1E-6 Torr.

Low pressure treatment at step 307 can last at least about 2 minutes, such as at least about 5 minutes, at least about 10 minutes, or even at least about 15 minutes. Low pressure treatment can extend for a period within a range between about 15 minutes and about 25 minutes.

After the step 307, the process of conditioning the scintillator crystal can continue at step 308 by flowing a purging gas through the sealed container for a flowing duration. In accordance with one particular embodiment, the flowing process is completed while the sealed container and the scintillator crystal are being heated. Generally, the purging gas is a halogen-containing gas, inert gas, or a noble gas. In accordance with a particular embodiment, argon is the purging gas. In accordance with another particular embodiment, the purging gas includes a halide gas, such as a fluorine-containing or chlorine-containing species, for example $CF_4$. The flow of certain halogen gases through the sealed container may facilitate reaction and removal of certain contaminate species from the sealed container.

During the process of flowing a purging gas through the sealed container, the gases generally flow at a substantial rate to facilitate sufficient purging of the atmosphere of the sealed container. In one embodiment, the gas is flowed into the sealed container of not less than about 10 liters/min. Other embodiments use greater rates, for example in one embodiment, the rate is at least about 20 liters/min. In accordance with a particular embodiment, the purging gas is flowed into the sealed container at a rate within a range between about 40 liters/min and about 80 liters/min.

The process of flowing a purging gas into the sealed container lasts for a flowing duration that is generally about 5 minutes. Still, greater durations may be used, for example in one embodiment, the flowing duration is at least about 10 minutes, or at least about 15 minutes. Typically, the flowing duration lasts for at least about 15 minutes and is not greater than about 30 minutes.

After completing the process of flowing a purging gas through the sealed container at step 308, certain procedures within the conditioning process may be repeated. As illustrated in FIG. 3, at step 309, a repeat or cycling process may be initiated by returning to step 307, and repeating steps 307 and 308. In accordance with one embodiment, steps 307 and 308 can be repeated at least once such that the conditioning process includes reducing the pressure, flowing a purging gas, reducing the pressure, and once again flowing a purging gas. In accordance with another embodiment, the conditioning process can include at least three cycles of repeating steps 307 and 308. The type of purging gases can be changed for each cycle of flowing a gas through the sealed container, for example, during a first flowing process a halogen-containing gas may be used, while in a subsequent flowing process an inert gas can be flowed through the sealed container.

As illustrated in FIG. 3 the conditioning process can be finalized by holding the scintillator crystal in a holding atmosphere at step 310 after sufficiently cycling through steps 307 and 308. During a holding procedure, the scintillator crystal is maintained in a holding atmosphere having a pressure greater than standard atmospheric pressure to avoid the creation of a negative pressure within the sealed container during cooling, which may allow the reentry of the ambient atmosphere into the sealed container. As such, in one embodiment the holding atmosphere has an absolute pressure of at least about 110 kPa. In other embodiments, the absolute pressure may be greater, for example at least about 117 kPa or at least about 131 kPa. Typically, the holding atmosphere has an absolute pressure within a range between about 110 kPa and about 152 kPa.

During the holding process the scintillator crystal is held at the elevated temperature, such as not less than about 120° C., not less than about 150° C., or even not less than about 175° C. The scintillator crystal can be held in the holding atmosphere for a duration of at least about 1 hour, for example, at least about 2 hours, at least about 4 hours, or even at least about 8 hours. In one particular embodiment, the scintillator crystal is held in the holding atmosphere for a least about 12 hours. The duration can be limited such as not greater than about 24 hours.

Upon finishing the holding process at step 310, the conditioning process is completed and the sealed container may be cooled and brought to ambient temperature in preparation for moving the scintillator crystal to a sealed workbox as illustrated at step 311. Moving of the scintillator crystal from the sealed container to the sealed workbox can be conducted such that the conditioned state of the scintillator crystal is maintained by substantially maintaining the environment around the scintillator crystal. As such, in one embodiment, the scintillator crystal is placed in a secondary container within the sealed container during the conditioning process, such that upon moving the scintillator crystal, the secondary container can be sealed, maintaining the conditioned state of the scintillator crystal. Alternatively, the sealed container can be attached directly to the sealed workbox, obviating the need for a secondary container.

Generally, the sealed workbox is capable of having a sealed atmosphere and being accessible by an operator such that the scintillation detector may be assembled therein. In accordance with one embodiment, the sealed workbox includes an assembly atmosphere, which is a controlled atmosphere suitable for assembling the scintillation detector therein. As such, the assembly atmosphere generally contains and inert gas or noble gas. In accordance with a particular embodiment, the assembly atmosphere comprises argon, such that the entire atmosphere consists essentially of argon.

Additionally, the assembly atmosphere has a low level of contaminants, particularly low levels of oxygen and water vapor. As such, in accordance with one embodiment, during assembly of the scintillation detector, the workbox has an oxygen content of not greater than about 10 ppm. In certain other embodiments, the oxygen content is less, such as not greater than about 5 ppm, not greater than about 3 ppm, or even not greater than about 1 ppm. The assembly atmosphere can have an oxygen content within a range between about 0.01 ppm and about 5 ppm.

The sealed workbox also has a water vapor content generally not greater than about 15 ppm. For example, in one embodiment, the assembly atmosphere has a water vapor content that is not greater than about 10 ppm, such as not greater than about 5 ppm, or even not greater than about 1 ppm. According to one certain embodiment, the sealed workbox has a water vapor content within a range between about 0.01 ppm and about 5 ppm. Such water vapor contents translate to a dew point of at least about −60° C. and more typically around −80° C.

In embodiments where the sealed container and sealed workbox are not connected, the assembly atmosphere can be obtained by purging the workbox. Such a purging process may include flowing an inert gas through the sealed workbox, and reducing pressure within the sealed workbox. Moreover, the use of gettering materials, such as a desiccant in the case of water vapor, and copper oxide in the case of oxygen, may be used to obtain a particularly dry and oxygen-depleted environment.

After moving the scintillator crystal to the sealed workbox at step 311, the process continues at step 313 by assembling the detector in the sealed workbox. Assembly of the detector can include forming a detector as illustrated in FIG. 2, including for example, the scintillator crystal, reflector, shock absorbing member, interface pad, sleeve, springs, the casing, and other components described herein. After assembling the components, the detector can be permanently sealed. In accordance with one embodiment, the sealing process includes a welding or brazing operation.

According to embodiments herein, the completed scintillation detector was found to have notable performance attributes. Embodiments utilizing rare earth halide crystals were found not only to have strong scintillation properties at low temperature applications, but have exceptional performance even after exposure to elevated temperatures for extended durations. Such performance is quantified in terms of relative light output LO(r), wherein LO(r)=(LO$_{100}$/LO$_0$)× 100%), wherein LO$_{100}$ is the detected light output of the detector of about 100 hours of exposure at 150° C., and LO$_0$ is the original detected light output at room temperature prior to exposure at 150° C. Embodiments have been measured to have a relative light output LO(r) of not less than about 75%, such as not less than about 80%, 85%, 90%, or even not less than about 92%. For clarity, the general designation "$LO_t$," is used herein to define the detected light output of the scintillation detector after a time of operation "t". It will be appreciated that the detected light output for a time of operation "t" of the detector is generally described herein in relative terms, as a ratio or percentage of the original detected light output of the detector at time zero, or $LO_0$. Unless otherwise specified herein, light output values are measured at room temperature, and are generated from application of 662 keV gamma rays issuing from a cesium isotope, Cs-137. $LO_0$ is measured at room temperature prior to exposure at elevated temperatures and $LO_t$ where t>0 is measured after cooling the detector from an elevated temperature to room temperature.

Figure 4:
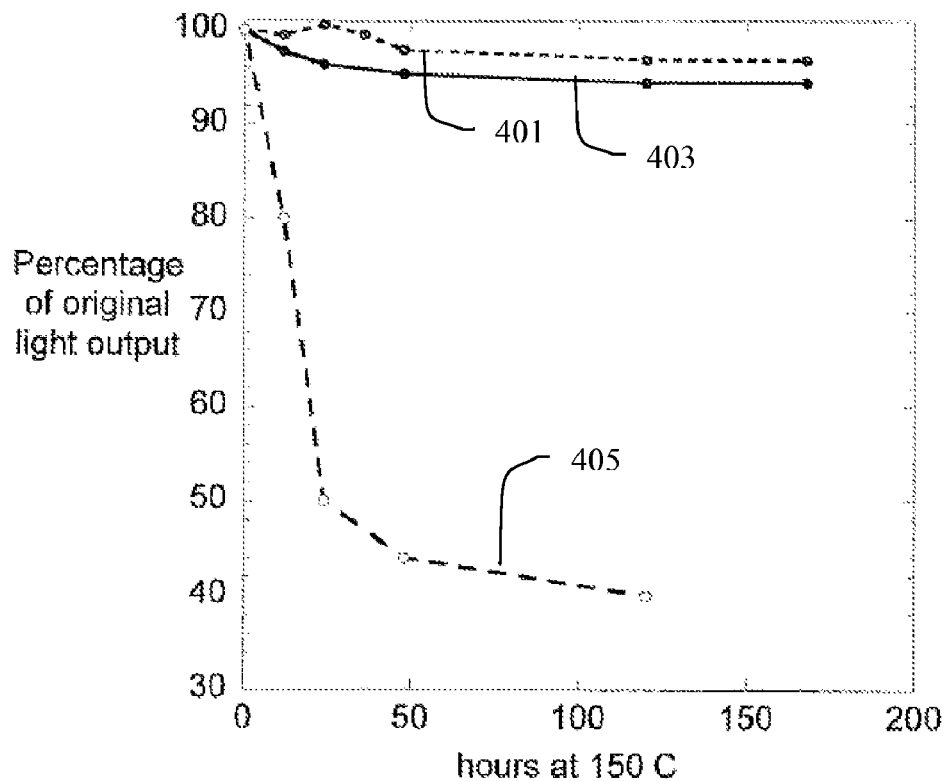
FIG. 4 includes a plot illustrating the percentage of original light output as a function hours of operation at 150° C. for three scintillation detectors, two of which, are in accordance with embodiments herein.

Referring to FIG. 4, a plot is illustrated showing a percentage of original light output of three scintillation detectors as a function of hours at 150° C., plots 401 and 403 represent scintillation detectors in accordance with embodiments herein, while plot 405 represents a conventional scintillation detector. The scintillation detectors represented by plots 401 and 403 were formed according to the process illustrated in FIG. 3, including a conditioning process of placing the $LaBr_3$:Ce scintillator crystal in an sealed container, heating the scintillator crystal to 150° C. at 1° C./min while reducing the pressure to 1E-5 Torr and subsequently flowing argon through the chamber at a rate of 50 liters/min for 15 minutes. The reducing pressure and flowing argon steps were repeated twice, while the sealed container was heating and upon reaching 150° C. the chamber was filled with argon to 131 kPa and held for 12 hours. After the conditioning, the sealed container was cooled and the scintillator crystal was passed to a sealed workbox having less than 1 ppm oxygen and less than 0.5 ppm water vapor, assembled into the detector and welded closed.

The scintillation detector of plot 405 was formed according to a conventional process similar to that disclosed in U.S. Pat. No. 4,764,677 and included a $LaBr_3$:Ce scintillator crystal for direct comparison with the embodiments described above. However, the scintillation detector of plot 405 did not undergo a conditioning process, and was instead assembled in a dry air atmosphere and subsequently placed in a vacuum oven, which was pumped down to a pressure of roughly 50 mTorr and heated to 150° C. and held at this temperature and pressure for 12 hours. The scintillation detector was then removed from the vacuum oven and passed to an argon filled welding box having an oxygen content of approximately 500 ppm and a water vapor content of approximately 21 ppm, and welded closed.

As clearly illustrated in FIG. 4, the scintillation detector formed to according to the conventional process demonstrates poor performance after only a 30 hours of exposure to the elevated temperatures. In contrast, the scintillation detectors of plots 401 and 403 demonstrate notable performance, with relative light output LO(r) not less than about 92%. Indeed, the scintillation detectors of plots 401 and 403 demonstrate a relative light output LO(r) of not less than about 94%, with very little decrease in performance for durations exceeding 100 hours. Notably, it was discovered that if the assembly and sealing environment were tightly controlled, to have less than about 1 ppm oxygen and less than 0.5 water vapor, the relative light output LO(r) results for $LaBr_3$:Ce-based detectors were formed to be inferior to the embodiments depicted in plots 401 and 403. Stated another way, identical detectors that were not subjected to the conditioning, having optimized assembly and sealing environments, were measurably inferior to the embodiments noted above, with such samples having a relative light output value LO(r) of at best 91% after 100 hours of operation at 150° C.

In addition to the improved light output performance noted above, the scintillation detectors described herein have superior energy resolution, especially after exposure to elevated temperatures for extended durations. The sensitivity of a detector can be quantified by the energy resolution, or the ability of the detector to accurately identify the energy of certain radiation. Typically, the resolution is quantified by determining full width half maximum (FWHM) values from a spectral curve (typically a Gaussian-shaped curve) for radiation striking the detector at a given energy. The smaller the FWHM value for a given spectral curve, the greater the energy resolution and accuracy of measurements. Exposure of a scintillation detector to elevated temperatures causes a decrease in the resolution that is detectable by an increase in the FWHM capabilities of the detector. The absolute energy resolution can be defined by the actual FWHM values, and the change in energy resolution is measured in terms of an energy resolution degradation factor ($\Delta ER$) that measures the percent change in the FWHM values after a certain duration at high temperatures.

In accordance with embodiments herein, the scintillation detectors have superior absolute energy resolution after extended durations at elevated temperatures. As such, in one embodiment, the scintillation detector can have an absolute energy resolution of not greater than about 35 keV (5.3%) at 662 keV after exposure to temperatures of not less than 150° C. for not less than about 100 hours. Other such embodiments can have a lower absolute energy resolution, such as not greater than about 30 keV (4.5%), 25 keV (3.8%), or even 20 keV (3.0%) after exposure to temperatures of not less than 150° C. for not less than about 100 hours. In one particular embodiment, the scintillation detector has an absolute energy resolution within a range between about 16 keV and about 20 keV. Moreover, the scintillation detectors herein can have the same absolute energy resolution values noted above after longer durations, such as not less than about 125 hours, about 150 hours, or even about 170 hours of exposure to temperatures of not less than about 150° C.

In accordance with embodiments herein, the energy resolution degradation factor is described by the equation $\Delta ER = ((ER_{100} - ER_0)/(ER_0)) \times 100\%$, wherein $ER_{100}$ is the energy resolution of the detector after about 100 hours of exposure at 150° C. and $ER_0$ is the original energy resolution at room temperature prior to exposure at 150° C. As such, the detectors herein demonstrate an $\Delta ER$ not greater than about 25%, 20%, 15%, or even not greater than about 10%, when measured at room temperature after 100 hours of exposure at 150° C. Like the performance characteristics detailed previously, the general designation "$ER_t$," is used herein to define the energy resolution of the scintillation detector after a time of operation "t". It will be appreciated that the energy resolution for a time of operation "t" of the detector is generally described herein in relative terms, as a ratio or percentage of the original energy resolution of the detector at time zero, or $ER_0$. The light output values are measured at room temperature, and are generated from application of 662 keV gamma rays issuing from a cesium isotope, Cs-137. $ER_0$ is measured at room temperature prior to exposure at elevated temperatures and $ER_t$ where t>0 is measured after cooling the detector from an elevated temperature to room temperature.

Table 1 below illustrates FWHM values for scintillation detectors previously described in accordance with FIG. 4. Notably, Samples 1 and 2 detailed in Table 1 correspond to those scintillation detectors 401 and 403 previously described in FIG. 4 and formed according to embodiments herein. The Comparative Sample, is the conventionally formed detector 405 formed and assembled according to the guidelines described above in FIG. 4. The comparative sample demonstrates a rapid increase in the FWHM values, such that only after 24 hours of exposure to 150° C. the FWHM values are twice as great and thus the resolution capabilities of the detector are half of what they were originally. In contrast, the scintillation detectors of Samples 1 and 2 demonstrate significantly less change, barely a 1% change in some cases, after being subject to temperatures of 150° C. for durations extending up to and beyond 100 hours.

TABLE 1

| Hours at 150° C. | Sample 1 | | Sample 2 | | Comparative Sample | |
|---|---|---|---|---|---|---|
| | FWHM (keV) | % Change | FWHM (keV) | % Change | FWHM (keV) | % Change |
| 0 | 18.6 | 0.0% | 18.9 | 0.0% | 19.1 | 0.0% |
| 12 | 18.5 | −0.5% | 19.7 | 4.2% | 32.0 | 67.5% |
| 24 | 19.0 | 2.2% | 20.0 | 5.8% | 40.2 | 110.5% |
| 36 | 18.9 | 1.6% | | | | |
| 48 | 18.9 | 1.6% | 20.3 | 7.4% | 44.7 | 134.0% |
| 120 | 18.9 | 1.6% | 20.4 | 7.9% | 45.3 | 137.2% |
| 168 | 18.9 | 1.6% | 20.3 | 7.4% | | |

Figure 5:
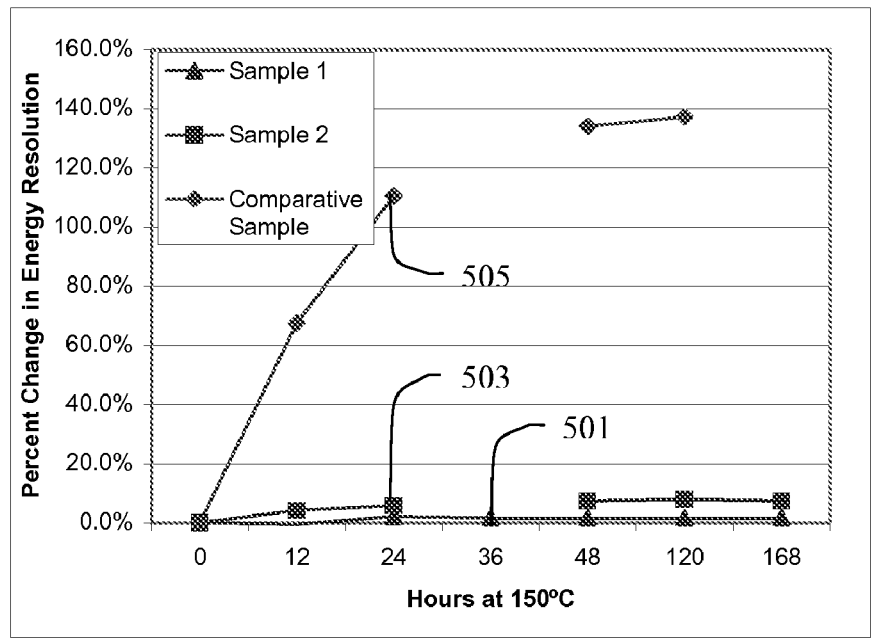
FIG. 5 includes a plot illustrating a percent change of energy resolution as a function hours of operation at 150° C. for three scintillation detectors, two of which, are in accordance with embodiments herein.

In fact, the discrepancy in performance is better illustrated in FIG. 5, which plots the percent change of energy resolution (i.e., ΔER) for the detectors after particular durations of exposure to 150° C. As illustrated in FIG. 5, Samples 1 and 2 correspond to the plots 501 and 503, respectively, and demonstrate a percent change in energy resolution significantly less than that of the conventional detector sample of plot 505. The scintillation detector formed according to the conventional process demonstrates poor performance after only a 12 hours of exposure to the elevated temperatures. The scintillation detectors of plots 501 and 503 demonstrate little change in the energy resolution after the first 24 hours at 150° C. and particularly an overall degradation factor that is less than 10% for extended durations. As such, it was discovered if assembly procedures and designs were used as described herein, the energy resolution degradation factor of rare-earth halide-based detectors were superior to conventional processes and designs.

According to the embodiments described herein, scintillation detectors are provided that have performance characteristics superior to the state of the art. It has been previously recognized that assembly of scintillation detectors in substantially dry environments having an inert atmosphere is suitable for traditional scintillator crystal materials, such as alkali halides. See for example U.S. Pat. No. 4,764,677. However, it was discovered that such processes proved unsuitable for forming scintillation detectors incorporating rare-earth halide crystals, as it was found that such crystals were found to be more reactive and/or are not as easily prepared for packaging than the traditional materials. In particular, upon observation of performance degradation as a function of time at elevated temperatures, studies were conducted to understand the root cause of the degradation. The studies revealed contamination issues that appeared to be particularly unique to rare-earth halide crystals.

For example, methods of fabricating scintillation detectors include a conditioning process as described in detail above, which may include repetitive cycling of various sub-steps. Certain embodiments additionally include cleaning processes for the crystal and the detector components, use of low volatility components within the detector, and assembly procedures previously unrecognized in the art.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A method of assembling a detector comprising:
   conditioning a rare-earth halide scintillator crystal in a sealed container, the conditioning process comprising:
   heating the scintillator crystal;
   reducing the pressure within the sealed container for an evacuation period while heating; and
   flowing a purging gas into and through the sealed container to purge the atmosphere in the sealed container, wherein flowing is conducted after reducing the pressure and while heating the scintillator crystal for a flowing duration; and
   assembling a detector comprising the scintillator crystal in an assembly environment comprising an inert gas.

2. The method of claim 1, wherein the purging gas is selected from the group of materials consisting of a halogen-containing gas, an inert gas, and a noble gas.

3. The method of claim 2, wherein the purging gas is argon.

4. The method of claim 2, wherein the purging gas is $CF_4$.

5. The method of claim 1, further comprising repeating the steps of reducing the pressure and flowing the purging gas while heating after completing flowing the purging gas.

6. The method of claim 5, further comprising completing at least three cycles of reducing the pressure and flowing the purging gas while heating.

7. The method of claim 1, further comprising holding the scintillator crystal in a holding atmosphere comprising the purging gas at a holding temperature after flowing the purging gas and before assembling.

8. The method of claim 7, further comprising holding the scintillator crystal in the holding atmosphere for at least about 1 hour.

9. The method of claim 1, wherein conditioning further comprises exposing the scintillator crystal to a reduced pressure atmosphere prior to heating.

10. The method of claim 1, further comprising cleaning detector components prior to assembling.

11. The method of claim 10, wherein cleaning comprises rinsing the detector components using an organic-based solvent.

12. The method of claim 1, wherein the assembly environment comprises argon.

13. The method of claim 1, wherein the assembly environment comprises an oxygen content of not greater than 10 ppm of oxygen.

14. The method of claim 1, wherein the assembly environment comprises a water vapor content of not greater than 15 ppm of water vapor.

15. The method of claim 1, wherein purging is completed to remove contaminate species from the sealed container.

16. The method of claim 1, wherein flowing the purging gas comprises flowing a gas into the sealed container at a rate of at least about 10 liters/min.

17. A scintillation detector comprising:
a rare-earth halide scintillator crystal in a sealed casing having a controlled atmosphere different than an ambient atmosphere and having an oxygen content not greater than about 10 ppm, the scintillation detector having a relative light output $LO(r)=((LO_{100})/(LO_0))\times 100\%$, of not less than about 75% wherein $LO_{100}$ is the detected light output of the detector after about 100 hours of exposure at 150° C. and $LO_0$ is the original detected light output at room temperature prior to exposure at 150° C.

18. The scintillation detector of claim 17, wherein $LO(r)$ is not less than about 85%, wherein $LO_{100}$ is the detected light output of the detector at room temperature after 100 hours of exposure at 150° C.

19. The scintillation detector of claim 17, the scintillator crystal is a material selected from the group consisting of activated lanthanum bromide and activated lanthanum chloride.

20. The scintillation detector of claim 17, wherein the controlled atmosphere comprises a water vapor content not greater than about 15 ppm.

21. A scintillation detector comprising:
a rare-earth halide scintillator crystal in a sealed casing having a controlled atmosphere different than an ambient atmosphere and having an oxygen content not greater than about 10 ppm, the scintillation detector having a relative light output $LO(r)=((LO_{150})/(LO_0))\times 100\%$, is within a range between about 99% and about 92%, wherein $LO_{150}$ is the detected light output of the detector after about 150 hours of exposure at 150° C. and $LO_0$ is the original detected light output at room temperature prior to exposure at 150° C.

* * * * *